United States Patent
Kim et al.

(10) Patent No.: US 10,075,977 B2
(45) Date of Patent: Sep. 11, 2018

(54) METHOD AND DEVICE FOR TRANSMITTING DATA IN WIRELESS LAN

(71) Applicant: LG ELECTRONICS INC., Seoul (KR)

(72) Inventors: Jeongki Kim, Seoul (KR); Kiseon Ryu, Seoul (KR); Giwon Park, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 112 days.

(21) Appl. No.: 14/909,047

(22) PCT Filed: Aug. 14, 2014

(86) PCT No.: PCT/KR2014/007572
§ 371 (c)(1),
(2) Date: Jan. 29, 2016

(87) PCT Pub. No.: WO2015/023143
PCT Pub. Date: Feb. 19, 2015

(65) Prior Publication Data
US 2016/0192397 A1 Jun. 30, 2016

Related U.S. Application Data

(60) Provisional application No. 61/865,622, filed on Aug. 14, 2013, provisional application No. 61/877,309, filed on Sep. 13, 2013.

(51) Int. Cl.
*H04W 74/08* (2009.01)
*H04W 74/00* (2009.01)
*H04W 84/12* (2009.01)

(52) U.S. Cl.
CPC ...... *H04W 74/0816* (2013.01); *H04W 74/004* (2013.01); *H04W 74/006* (2013.01); *H04W 84/12* (2013.01)

(58) Field of Classification Search
None
See application file for complete search history.

(56) References Cited

U.S. PATENT DOCUMENTS 7,522,576 B2* 4/2009 Du .................. H04W 74/002
370/338
2002/0163933 A1* 11/2002 Benveniste ............ H04L 47/10
370/465

(Continued)

FOREIGN PATENT DOCUMENTS

KR    10-2010-0096210    9/2010

OTHER PUBLICATIONS

Bharghavan et al. "MACAW: A Media Access Protocol for Wireless LAN's." UC Berkeley, 1994.*

(Continued)

*Primary Examiner* — Andrew Oh
(74) *Attorney, Agent, or Firm* — Lee, Hong, Degerman, Kang & Waimey

(57) ABSTRACT

A method for transmitting data in wireless LAN may include the step of: receiving a non-target RTS frame from a second STA by a first STA, wherein the non-target RTS frame includes an RA field indicating a third STA; when the first STA does not receive a non-target CTS frame after a predetermined time and tries to transmit a data frame to an AP, transmitting an RTS frame to the AP by the first STA, wherein the non-target CTS frame is a response frame to the non-target RTS frame; and when the first STA has received a CTS frame in response to the RTS frame from the AP, transmitting the data frame to the AP by the first STA.

12 Claims, 14 Drawing Sheets

(56) References Cited

U.S. PATENT DOCUMENTS

| | | | |
|---|---|---|---|
| 2005/0002364 A1* | 1/2005 | Ozer | H04W 74/0816 370/338 |
| 2007/0115907 A1 | 5/2007 | Myles et al. | |
| 2007/0288620 A1* | 12/2007 | Jang | H04W 80/02 709/223 |
| 2008/0026797 A1* | 1/2008 | Nanda | H01Q 1/246 455/562.1 |
| 2008/0111885 A1* | 5/2008 | Voglewede | G08B 21/12 348/152 |
| 2008/0144493 A1* | 6/2008 | Yeh | H04W 52/50 370/230 |
| 2008/0298250 A1* | 12/2008 | Larsson | H04L 45/123 370/238 |
| 2008/0298306 A1* | 12/2008 | Larsson | H04L 1/0002 370/328 |
| 2009/0154372 A1 | 6/2009 | Wang et al. | |
| 2010/0002639 A1* | 1/2010 | Qin | H04W 74/0891 370/329 |
| 2010/0014502 A1* | 1/2010 | Singh | H04B 7/12 370/343 |
| 2010/0329178 A1* | 12/2010 | Cordeiro | H04W 74/0816 370/328 |
| 2011/0038358 A1* | 2/2011 | Wang | H04W 74/0816 370/338 |
| 2011/0064013 A1 | 3/2011 | Liu et al. | |
| 2011/0149939 A1* | 6/2011 | Wang | H04W 48/02 370/338 |
| 2011/0222398 A1* | 9/2011 | Ribeiro | H04W 74/0816 370/230 |
| 2012/0044844 A1* | 2/2012 | Trainin | H04L 12/413 370/310 |
| 2012/0051251 A1* | 3/2012 | Seo | H04W 74/085 370/252 |
| 2012/0087316 A1* | 4/2012 | Merlin | H04W 28/26 370/329 |
| 2012/0263091 A1* | 10/2012 | Kim | H04B 7/0452 370/312 |
| 2012/0327870 A1* | 12/2012 | Grandhi | H04W 28/06 370/329 |
| 2013/0012221 A1* | 1/2013 | Zou | H04W 72/10 455/452.1 |
| 2013/0225221 A1* | 8/2013 | Nentwig | H04W 72/04 455/510 |
| 2014/0022987 A1* | 1/2014 | Kao | H04N 21/6131 370/328 |
| 2014/0146803 A1* | 5/2014 | Lee | H04W 4/06 370/338 |
| 2015/0009879 A1* | 1/2015 | Kim | H04W 74/06 370/311 |
| 2015/0071211 A1* | 3/2015 | Seok | H04W 74/04 370/329 |
| 2015/0078230 A1* | 3/2015 | Choi | H04W 74/04 370/311 |
| 2015/0085780 A1* | 3/2015 | Kim | H04W 52/0216 370/329 |
| 2015/0098447 A1* | 4/2015 | Kim | H04W 74/00 370/331 |
| 2015/0103767 A1* | 4/2015 | Kim | H04W 74/06 370/329 |
| 2015/0124784 A1* | 5/2015 | Choi | H04W 74/04 370/336 |
| 2015/0181620 A1* | 6/2015 | Seok | H04W 74/08 370/311 |
| 2015/0237578 A1* | 8/2015 | Gogate | H04W 52/0225 370/311 |
| 2016/0088665 A1* | 3/2016 | Kim | H04W 74/008 370/329 |

OTHER PUBLICATIONS

PCT International Application No. PCT/KR2014/007572, International Search Report dated Nov. 27, 2014, 3 page.

\* cited by examiner

FIG. 1
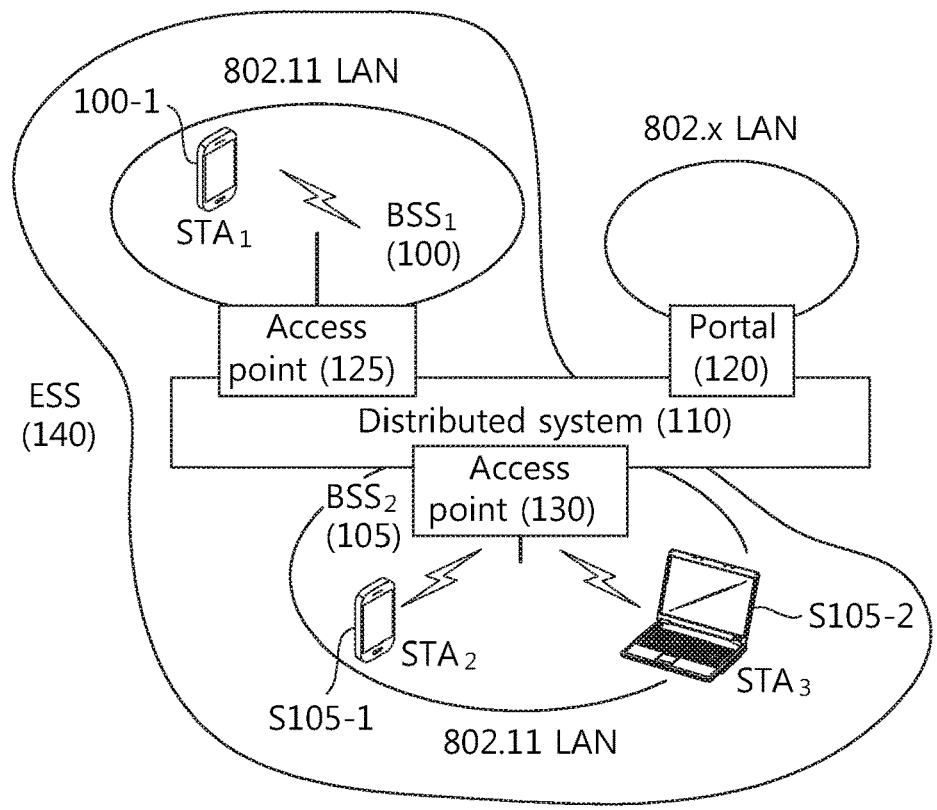
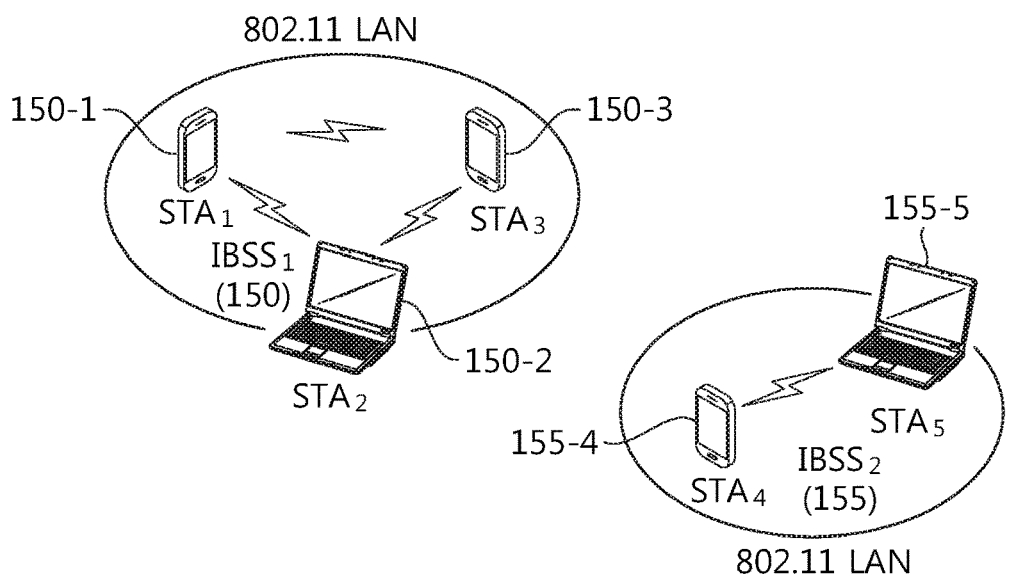

FIG. 3
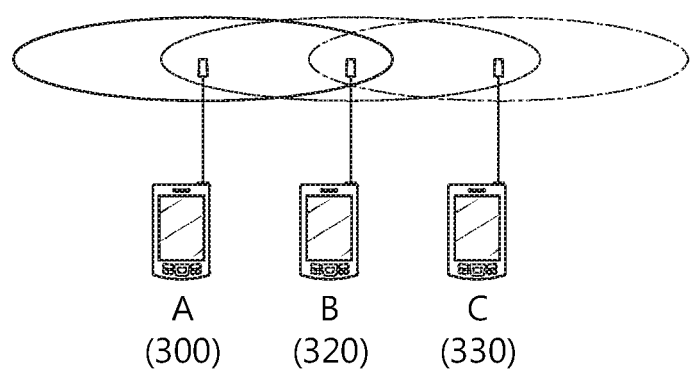
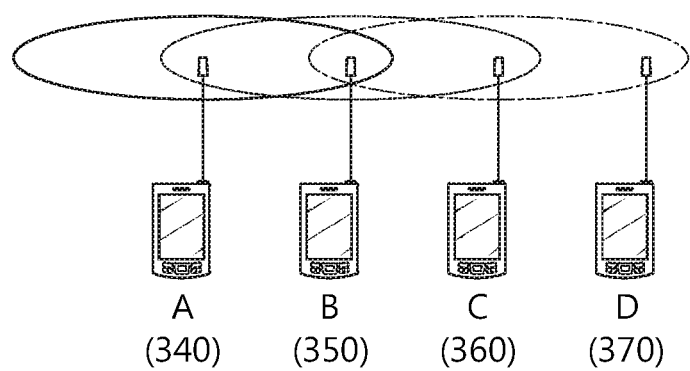

FIG. 4
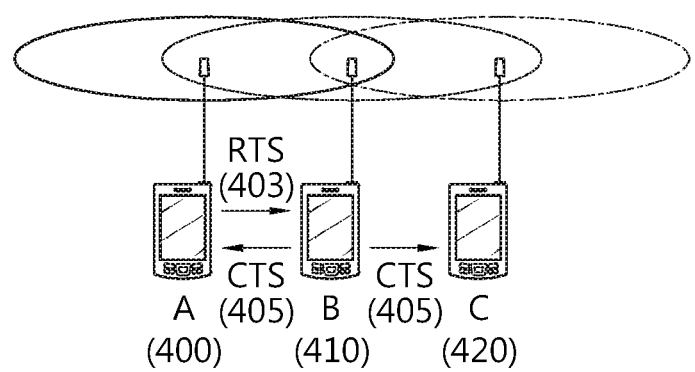
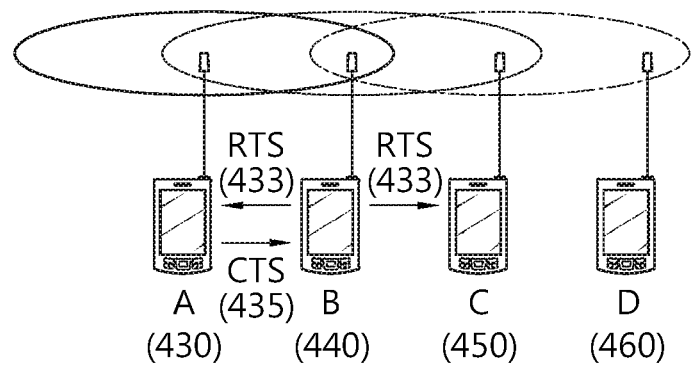

METHOD AND DEVICE FOR TRANSMITTING DATA IN WIRELESS LAN

CROSS-REFERENCE TO RELATED APPLICATIONS

This application is the National Stage filing under 35 U.S.C. 371 of International Application No. PCT/KR2014/007572, filed on Aug. 14, 2014, which claims the benefit of U.S. Provisional Application No. 61/865,622, filed on Aug. 14, 2013, and 61/877,309, filed on Sep. 13, 2013, the contents of which are all hereby incorporated by reference herein in their entirety.

BACKGROUND OF THE INVENTION

Field of the Invention

The present invention relates to wireless communications, and more particularly, to a method and apparatus for transmitting data in wireless local area network (WLAN).

Related Art

The Institute of Electrical and Electronics Engineers (IEEE) 802.11 Wireless Next Generation Standing Committee (WNG SC) is an ad hoc committee which conducts medium- and long-term examinations on a next-generation wireless local area network (WLAN).

At the IEEE conference in March, 2013, Broadcom suggested, based on the WLAN standardization history, the need for discussions on the next-generation WLAN subsequent to IEEE 802.11 ac in the first half of 2013 when the IEEE 802.11ac standards were finalized. On the basis of technical necessity and need for standardization, a motion for creating a study group for the next-generation WLAN was carried at the IEEE conference in March, 2013.

The scope of the HEW mainly discussed by the study group for the next-generation WLAN so called a high efficiency WLAN (HEW) includes 1) improvement in a 802.11 physical (PHY) layer and medium access control (MAC) layer in 2.4 GHz and 5 GHz bands, 2) increase in spectrum efficiency and area throughput, and 3) performance improvement in actual indoor and outdoor environments, such as environments including interference sources, crowded heterogeneous networks and environments having high user load. The HEW mostly considers a scenario of an environment crowed with access points (APs) and stations (STAs), and the HEW conduct discussions on improvement in spectrum efficiency and area throughput in this situation. In particular, the HEW pays attention to improvement in practical performance not only in indoor environments but also in outdoor environments, which are not substantially considered in existing WLANs.

The HEW pays substantial attention to scenarios for a wireless office, a smart home, a stadium, a hotspot and a building/apartment, and discussions on system performance improvement in an environment crowed with APs and STAs based on a corresponding scenario are conducted.

Discussions are expected to be vigorous on system performance improvement in an overlapping basic service set (OBSS) environment and outdoor environment, instead of single link performance improvement in a single basic service set (BSS), and on cellular offloading. This HEW orientation means that the next-generation WLAN gradually has a similar technological scope to that of mobile communication. Considering that mobile communication technology is discussed along with WLAN technology in small cell and direct-to-direct (D2D) communications areas, technological and business convergence of the next-generation WLAN based on the HEW and mobile communication is expected to be further promoted.

SUMMARY OF THE INVENTION

An object of the present invention is to provide a method for transmitting data in WLAN.

Another object of the present invention is to provide an apparatus for transmitting data in WLAN.

In an aspect, a method for transmitting data in wireless local network (WLAN) may include receiving, by a first station (STA), a non-target request to send (RTS) frame from a second STA, wherein the non-target RTS frame include a receiving address (RA) field indicating a third STA, transmitting, by the first STA, a request to send (CTS) frame to an access point (AP) if the first STA fails to receive a non-target CTS frame in a predetermined time and tries to transmit a data frame to the AP, wherein the non-target CTS frame is a response frame to the non-target RTS frame, and transmitting, by the first STA, the data frame to the AP if the first STA receives a CTS frame in response to the RTS frame from the AP, wherein a first duration value included in the RTS frame for determining a transmission duration of the data frame may be determined based on a second duration value included in the non-target RTS frame.

In another aspect, a first station (STA) for transmitting data in wireless local network (WLAN) may include a radio frequency (RF) unit implemented to transmit and receive a wireless signal, and a processor selectively connected to the RF unit, wherein the processor is configured to perform, receiving a non-target request to send (RTS) frame from a second STA, wherein the non-target RTS frame include a receiving address (RA) field indicating a third STA, transmitting a request to send (CTS) frame to an access point (AP) if the first STA fails to receive a non-target CTS frame in a predetermined time and tries to transmit a data frame to the AP, wherein the non-target CTS frame is a response frame to the non-target RTS frame, and transmitting the data frame to the AP if the first STA receives a CTS frame in response to the RTS frame from the AP, wherein a first duration value included in the RTS frame for determining a transmission duration of the data frame may be determined based on a second duration value included in the non-target RTS frame.

By transmitting data without unnecessary network allocation vector (NAV) configuration, the resource use efficiency in WLAN may be increased.

BRIEF DESCRIPTION OF THE DRAWINGS

FIG. 1 is a concept view illustrating the structure of a wireless local area network (WLAN).

FIG. 3 is a conceptual diagram illustrating an issue that may occur when an STA senses a medium.

FIG. 4 is a conceptual diagram illustrating a method for transmitting and receiving the RTS frame and the CTS frame in order to solve the hidden node issue and the exposed node issue.

DESCRIPTION OF EXEMPLARY EMBODIMENTS

FIG. 1 is a concept view illustrating the structure of a wireless local area network (WLAN).

An upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
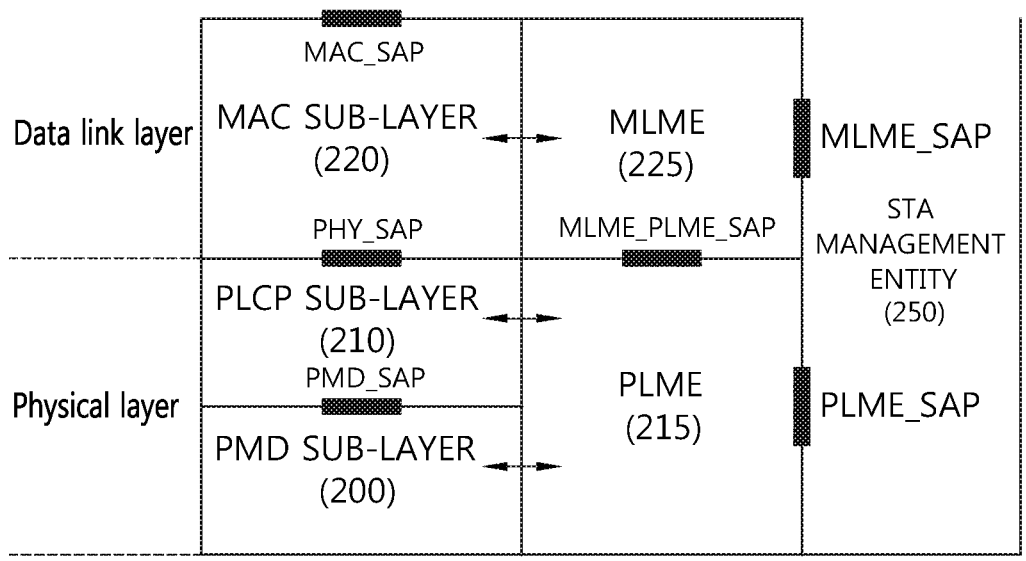
FIG. 2 is a view illustrating a layer architecture of a WLAN system supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 210 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

FIG. 3 is a conceptual diagram illustrating an issue that may occur when an STA senses a medium.

An upper end of FIG. 3 illustrates a hidden node issue and a FIG. 3(B) illustrates an exposed node issue.

At the upper end of FIG. 3, it is assumed that an STA A 300 and an STA B 320 transmit and receive current data and an STA C 330 and an STA B 320 has data to be transmitted. When the data is transmitted and received between the STA A 300 and the STA B 320, a specific channel may be busy. However, when the STA C 330 carrier-senses a medium before transmitting the data to the STA B 320 due to transmission coverage, the STA C 330 may determine that the medium for transmitting the data to the STA B 320 is in an idle state. When the STA C 330 determines that the medium is in the idle state, the data may be transmitted from the STA C 330 to the STA B 320. Consequently, since the STA B 320 simultaneously receives information of the STA A 300 and the STA C 330, a collision of data occurs. In this case, the STA A 300 may be a hidden node as the STA C 330.

At a lower end of FIG. 3, it is assumed that an STA B 350 transmits data to an STA A 340. When an STA C 360 intends to transmit data to an STA D 370, the STA C 360 may perform carrier sensing in order to find whether the channel is busy. The STA C 360 may sense that the medium is busy due to transmission coverage of the STA B 350 because the STA B 350 transmits information to the STA A 340. In this case, although the STA C 360 intends to transmit data to the STA D 370, since it is sensed that the medium is busy, the STA C 360 may not transmit the data to the STA D 370. Until it is sensed that the medium is idle after the STA B 350 completes transmitting the data to the STA A 340, a situation in which the STA C 360 needs to unnecessarily wait occurs. That is, although the STA A 340 is out of a carrier sensing range of the STA C 360, the STA A 340 may prevent data transmission by the STA C 360. In this case, the STA C 360 becomes an exposed node of the STA B 350.

In order to solve the hidden nose issue disclosed at the upper end of FIG. 3 and the exposed node issue disclosed at the lower end of FIG. 3, it may be sensed whether the medium is busy by using an RTS frame and a CTS frame in a WLAN.

FIG. 4 is a conceptual diagram illustrating a method for transmitting and receiving the RTS frame and the CTS frame in order to solve the hidden node issue and the exposed node issue.

Referring to FIG. 4, short signaling frames such as the request to send (RTS) frame and the clear to send (CTS) frame may be used in order to solve the hidden node issue and the exposed node issue. It may be overheard whether data is transmitted and received among neighboring STAs based on the RTS frame and the CTS frame.

An upper end of FIG. 4 illustrates a method for transmitting an RTS frame 403 and a CTS frame 405 in order to solve the hidden node issue.

Assumed that both an STA A 400 and an STA C 420 intend to transmit data to an STA B 410, when the STA A 400 sends the RTS frame 403 to the STA B 410, the STA B 410 may transmit the CTS frame 405 to both the STA A 400 and the STA C 420 therearound. The STA C 420 that receives the CTS frame 405 from the STA B 410 may obtain information indicating that the STA A 400 and the STA B 410 are transmitting data. Further, the RTS frame 403 and the CTS frame 405 include a duration field including information on a busy duration of a radio channel to configure a network allocation vector (NAV) during a predetermined duration so as to prevent the STA C 420 from using the channel.

The STA C 420 waits until the transmission and reception of the data between the STA A 400 and the STA B 410 is completed, and as a result, the STA C 420 may avoid the collision at the time of transmitting the data to the STA B 410.

A lower end of FIG. 4 illustrates a method for transmitting an RTS frame 433 and a CTS frame 435 in order to solve the exposed node issue.

An STA C 450 overhears transmission of the RTS frame 433 and the CTS frame 435 of an STA A 430 and an STA B 440, and as a result, the STA C 450 may find that no collision occurs in spite of transmitting the data to another STA D 460. That is, the STA B 440 transmits the RTS frame 433 to all neighboring terminals and transmits the CTS frame 435 to only the STA A 430 to which the STA B 440 needs to actually transmit data. Since the STA C 450 receives only the RTS frame 433 and may not receive the CTS frame 435 of the STA A 430, it may be found that the STA A 430 is out of a carrier sensing range of the STA C 450. Accordingly, the STA C 450 may not transmit data to the STA D 460.

An RTS frame format and a CTS frame format are disclosed in 8.3.1.2 RTS frame format and 8.3.1.3 CTS frame format of "IEEE Standard for Information Technology Telecommunications and information exchange between systems Local and metropolitan area networks Specific requirements Part 11: Wireless LAN Medium Access Control (MAC) and Physical Layer (PHY) Specifications which is IEEE Draft P802.11-REVmb.TM./D12 opened in November 2011.

Figure 5:
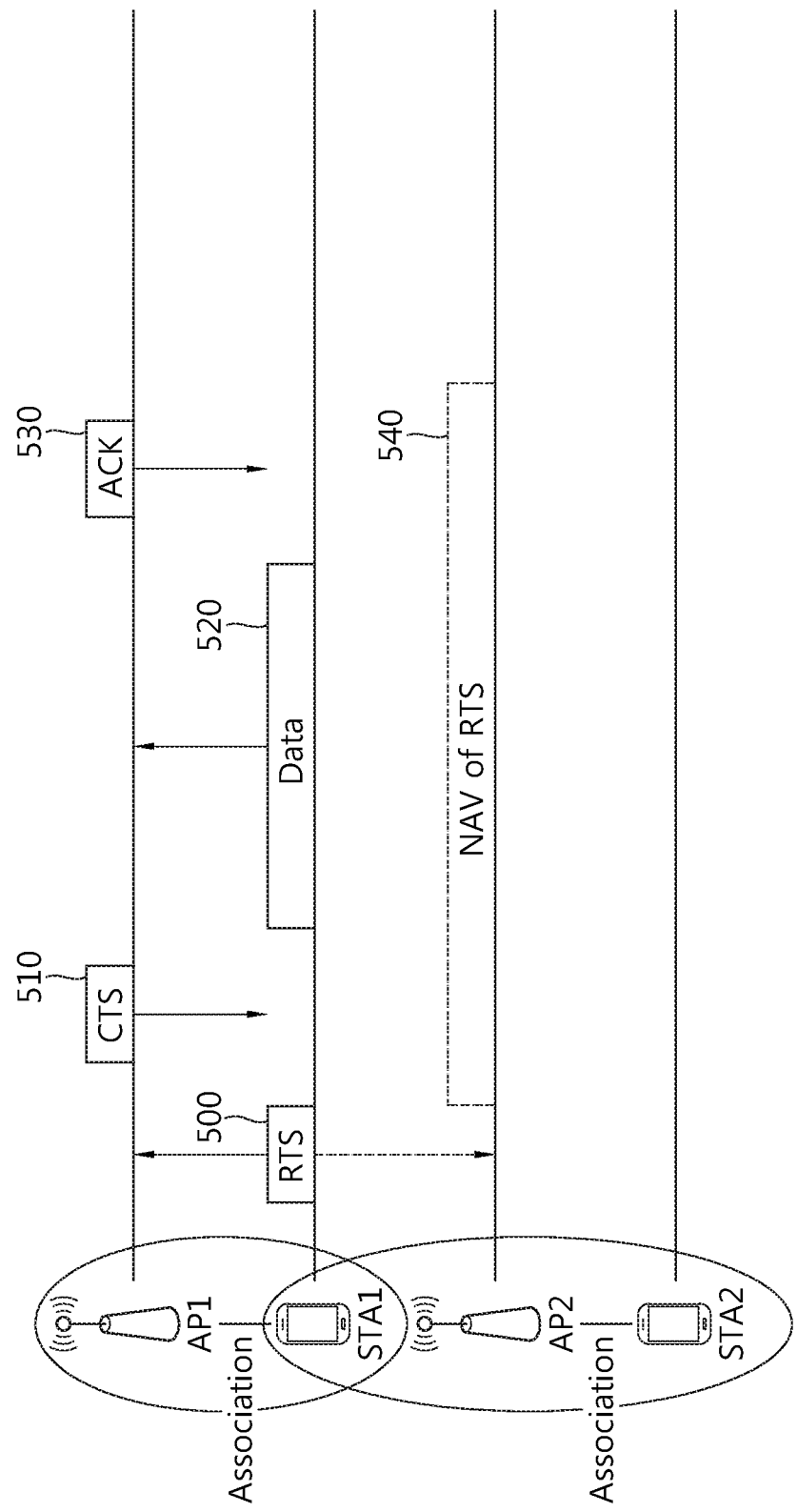
FIG. 5 is a conceptual diagram illustrating a possibility of performance degradation of WLAN when transmitting the existing RTS frame/CTS frame.

FIG. 5 is a conceptual diagram illustrating a possibility of performance degradation of WLAN when transmitting the existing RTS frame/CTS frame.

FIG. 5 shows unnecessary constraints on resource use that occur owing to the NAV configured due to the RTS frame and/or the CTS frame, in case that the RTS frame and the CTS frame are transmitted and received in the existing WLAN system and data frame is transmitted.

Referring to FIG. 5, the case is assumed that an STA1 and an AP1 are associated and an STA2 and an AP2 are associated. In addition, the case is assumed that the STA1 is included in the coverage of the AP1 and the AP2.

The STA1 may perform channel sensing based on CCA in order to transmit frames. In case that the channel is idle, the STA1 may transmit a RTS frame 500 to the AP1. The AP1 that receives the RTS frame 500 may transmit a CTS frame 510 to the STA1, and the STA1 that receives the CTS frame 510 may transmit a data frame 520 to the AP1. After the transmission of the data frame 520 is completed by the STA1, the AP1 transmit an ACK 530 to the STA1.

The AP2 may hear the RTS frame 500 which is transmitted by the STA1, and setup a NAV. Although the AP2 is available to utilize a part of section within the NAV configuration section and use it for transmitting data to the STA2, the AP2 is unable to transmit data owing to the configuration of NAV.

That is, in an environment where may STAs are installed, the case that resource use efficiency of WLAN is decreased occurs due to the transmission and reception of the RTS frame and the CTS frame.

Hereinafter, in the embodiments of the present invention, a method is described for increasing resource use efficiency in WLAN environment where the RTC frame and the CTS frame are transmitted and received.

Figure 6:
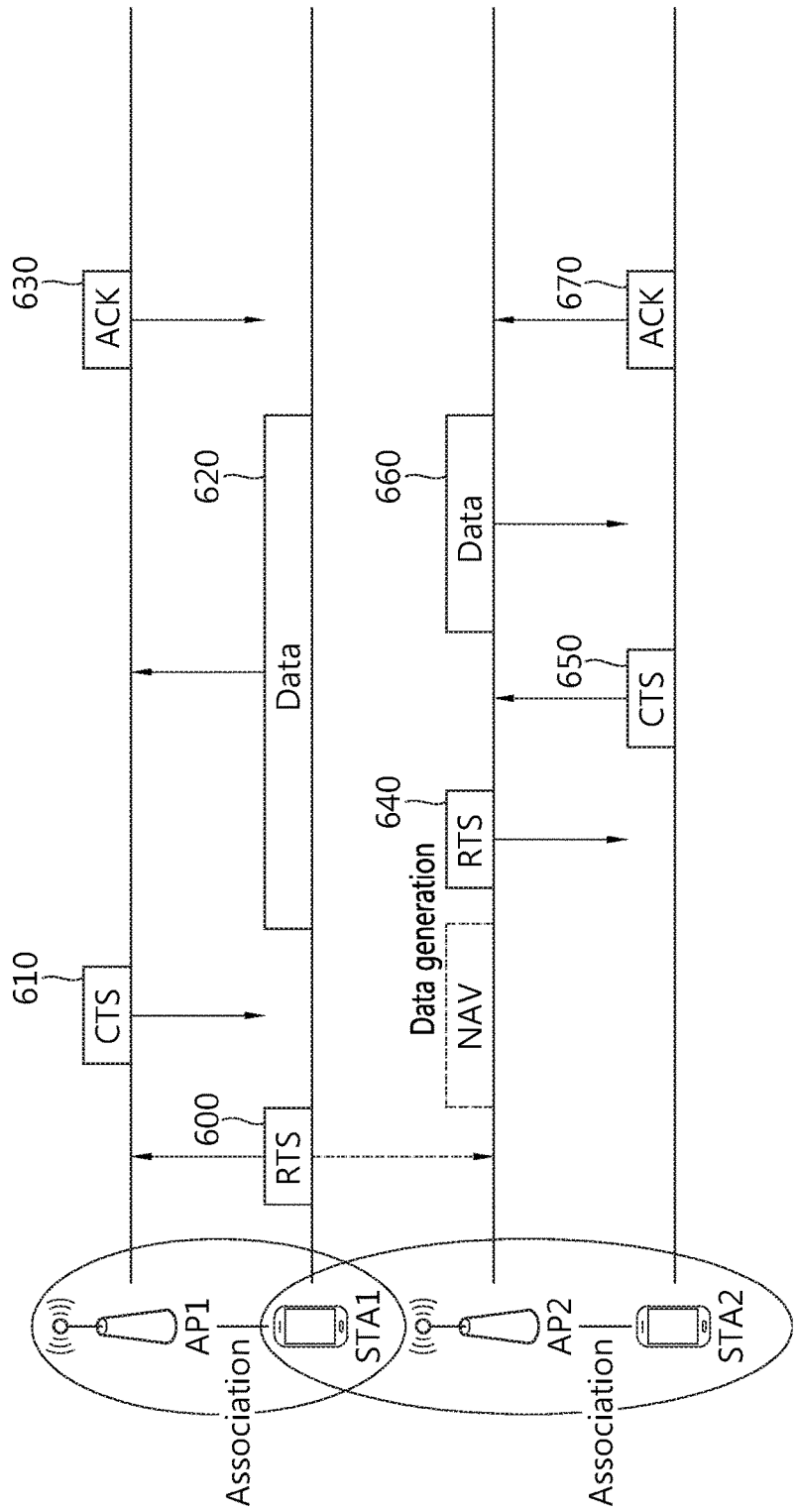
FIG. 6 is a conceptual diagram illustrating a transmission of data frame after an NAV is setup according to an embodiment of the present invention.

FIG. 6 is a conceptual diagram illustrating a transmission of data frame after an NAV is setup according to an embodiment of the present invention.

FIG. 6 shows an operation that an AP2 transmits data (data frame, management frame, etc.) to an STA2 after the NAV is setup based on a RTS frame by the AP2. The data may be used as a term that includes various frames that are transmitted by the AP2. In addition, in FIG. 6, it is assumed that each of the STA1 and STA2 is mutually hidden node and each of the AP1 and AP2 is mutually hidden node.

Referring to FIG. 6, the AP2 may receive a RTS frame 600 from the STA1. The RTS frame 600 may include a receiver address (RA) field and a duration field.

The RA field may include identifier information of an object STA that is for receive the RTS frame 600.

The duration field may include information on time resources for a CTS frame 610, a data frame 620 and an ACK 630 that will be transmitted between the STA1 and the AP1 after the RTS frame 600. The duration field may be used for configuring transmission opportunity (TXOP) of a TXOP holder.

In case that the RA of the RTS frame 600 received from the STA1 is not an address of the AP2 (that is, in case of the RTS frame which is not targeted to the AP2), the AP2 may check a duration field included in the RTS frame 600 and setup a NAV. Hereinafter, in an embodiment of the present invention, the RTS frame 600 which is not targeted to the AP2 may be expressed by a term, a non-target RTS frame. That is, the RTS frame 600 which is not targeted to a specific AP (or STA) among the RTS frames received by a specific AP (or STA) may be expressed by a term, non-target RTS frame. The data frame which is not targeted to a specific AP (or STA) among the data frames received by a specific AP (or STA) may be expressed by a term, non-target data frame.

If the AP2 receives the non-target RTS frame 600 and the AP2 receives the non-target CTS frame 610 after a predetermined time (e.g., SIFS), it may be identified whether the RA field included in the non-target CTS frame 610 is identical to the transmitter address (TA) field of the non-target RTS frame 600. The RA field of the non-target CTS frame 610 may include information on an identifier of the reception STA of the non-target CTS frame 610. The TA field of the non-target CTS frame 610 may include information on an identifier of the reception STA of the non-target CTS frame 610. The AP2 may update a NAV by determining whether an identifier of the reception STA of the non-target CTS frame 610 is identical to an identifier of the transmission STA of the non-target RTS frame 600 which is previously received. This will be described by reference to FIG. 7 and FIG. 8 in detail.

If the non-target CTS frame 610 is transmitted to the AP2, the AP2 should maintain the NAV configuration and may not transmit a RTS frame 640 and a data frame 660. However, if the non-target CTS frame 610 is not transmitted to the AP2 and only non-target RTS frame 600 is transmitted, the AP2 may release the NAV configuration and transmit a data frame 650. By using such a method, the efficiency of radio resource use in WLAN may be increased.

The AP2 may receive the non-target RTS frame 600 and may not receive the non-target CTS frame 610 in a predetermined time. For example, the predetermined time may be a time that corresponds to the SIFS after receiving the non-target RTS frame 600. The AP2 that fails to receive the non-target CTS frame 610 in a predetermined time may release the NAV configuration and transmit the RTS frame 640 to the STA2 which is associated with the AP2. If the AP2, after transmitting the RTS frame 640 to the STA2, receives the CTS frame 650 from the STA2 after the SIFS, the AP2 may transmit the data frame 660 to the STA2 that transmitted the CTS frame 650.

Further, if the non-target RTS frame 600 received by the AP2 is a frame transmitted from an STA which is not belonged to the BSS of the AP2, the AP may maintain the NAV configuration.

The AP2 may transmit the RTS frame 640 and the data frame 660 by considering the non-target RTS frame 600 and/or the non-target data frame 620 transmitted to the AP1 from the STA1. Particularly, the AP2 may setup the TXOP for transmitting the RTS frame 640 and the data frame to the STA2 by considering information on the TXOP of the STA1 and/or the AP1 which is received based on the non-target RTS frame 640 previously transmitted by the STA1. The TXOP of the STA1 and/or the AP1 may correspond to the time resource which is allocated for transmitting or receiving data by STA1 and/or AP1.

In addition, the AP2 may update the information on the TXOP of the STA1 and/or the AP1 based on the non-target data frame 620. An AP may use the information on the TXOP of the STA1 and/or the AP1 for determining the transmission completion time of the data frame 660 of the AP2.

In particular, the AP2 may update the information on the TXOP of the STA1 and/or the AP1 based on modulation and coding scheme (MCS) of the SIG included in a PLCP header of a PPDU that carries the non-target data frame 620, a length field or a duration field of a MAC header of an MPDU.

The transmission completion time of the data frame 660 transmitted to the STA2 by the AP2 may be determined by considering the TXOP of the STA1 and/or the AP1 which is acquired based on the non-target RTS frame 600 and/or the non-target data frame 620. The transmission completion time of the data frame 660 transmitted by the AP2 may be setup as shorter or the same as the transmission completion time of the non-target data frame 620. Or, transmission completion time of ACK for the data frame 660 transmitted by the AP2 may be setup as the same as the transmission completion time of the non-target data frame 620 transmitted by the STA1.

For example, in case that the transmission completion time of the data frame 660 which is to be transmitted by the AP2 is after the transmission completion time of the non-target data frame 620, the AP2 may transmit a fragmented data frame by fragmenting a part of the data frame 660. Or, in case that the transmission completion time of the data frame 660 which is to be transmitted by the AP2 is before the transmission completion time of the non-target data frame 620, the AP2 may transmit the data frame 660 as it is. However, in order to match the transmission completion time of the data frame 660 with the transmission completion time of the non-target data frame 620, a padding bit may be included in the data frame 660.

A duration value of the RTS frame transmitted by the AP2 may be determined as follows.

A first duration value included in the RTS frame for determining transmission duration of a data frame may be determined based on a second duration value included in a non-target RTS frame. Particularly, the first duration value of the RTS frame may be determined such that the transmission of the data frame is completed before the transmission completion time of the non-target data frame which is transmitted by a second STA after transmitting the non-target RTS frame. At the moment, the transmission completion time may be determined based on the second duration value.

Or, the first duration value of the RTS frame may be determined such that the reception of a data frame and an acknowledgement (ACK) frame for the data frame is completed before the transmission completion time of the non-target data frame which is transmitted by the second STA after transmitting the non-target RTS frame.

According to another embodiment of the present invention, the transmission of a data frame by the AP2 may be performed between the AP2 and the STA2 without transmitting the RTS frame/CTS frame. For example, in case that a duration (or a length of data frame) of a data frame which is to be transmitted by the AP is longer than a predetermined duration, the AP2 may transmit the data frame to the STA2 without transmitting the RTS frame. In particular, the AP2 may transmit a data frame to the STA2 by considering only the TXOP of the AP1 and/or the STA1 without transmitting the RTS frame to the STA2. Even in this case, the data frame may be transmitted by occupying a medium before completing the transmission of the non-target data frame by the STA1.

Whether the duration of the data frame which is to be transmitted by the AP2 is longer than a predetermined duration may be determined by considering the TXOP of the STA1 and/or the AP1 which is acquired. That is, depending on a size of the time resource that corresponds to the TXOP of the STA1 and/or the AP1, whether the duration of the data frame which is to be transmitted by the AP2 is longer than a predetermined duration may be differently determined. In case of using the method, the radio resource for transmitting the RTS frame/CTS frame may be used for transmitting a data frame. Accordingly, the use efficiency of radio medium may be increased.

Figure 7:
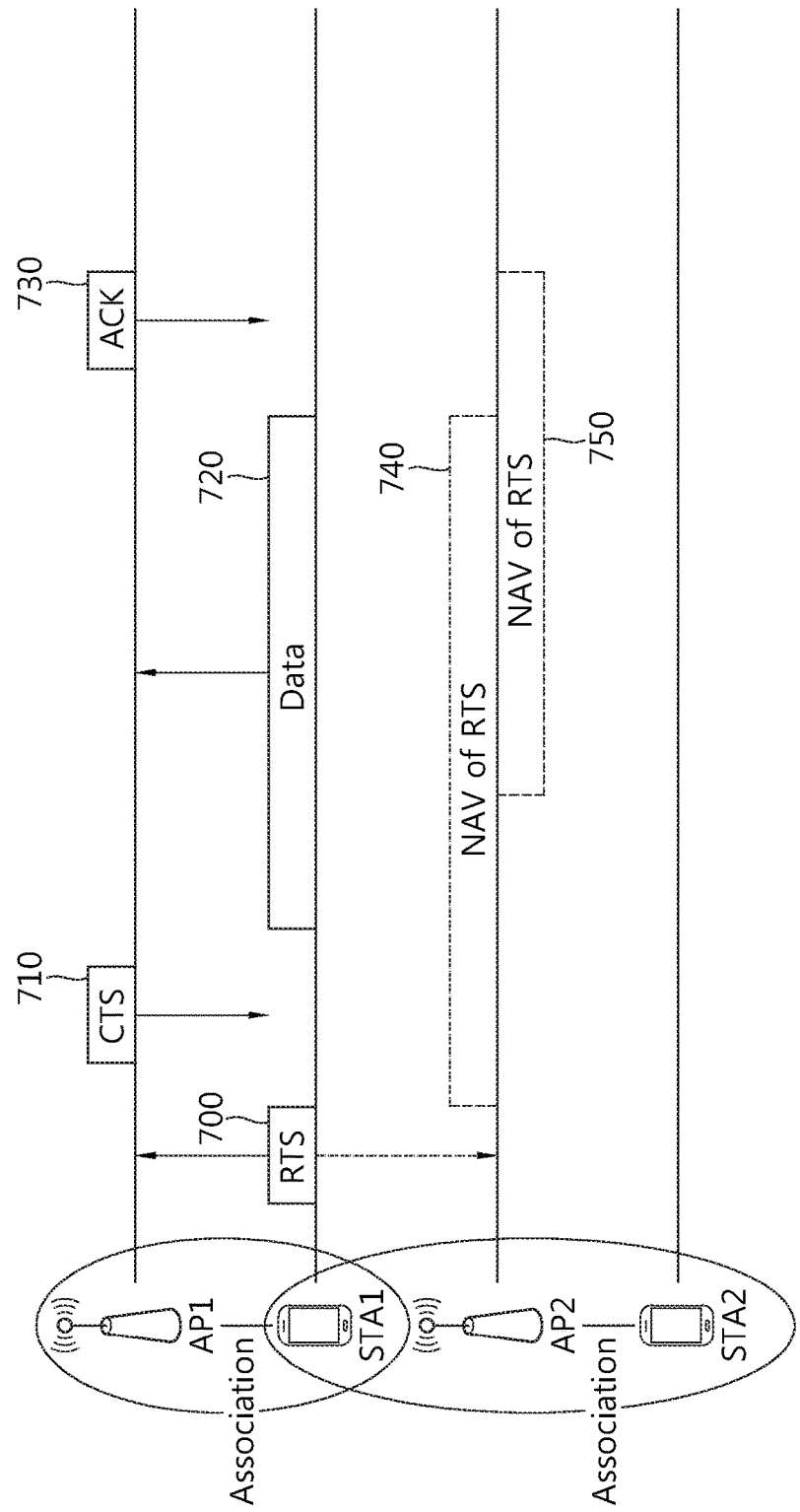
FIG. 7 is a conceptual diagram illustrating a method for setup a NAV according to an embodiment of the present invention.

FIG. 7 is a conceptual diagram illustrating a method for setup a NAV according to an embodiment of the present invention.

FIG. 7 shows a method for updating a NAV of an AP2 in case that the AP2 receives a non-target CTS frame 710 in addition to a non-target RTS frame 700. In FIG. 7, a case is assumed that an identifier of a reception STA of the non-target CTS frame 710 and an identifier of a transmission STA of the non-target RTS frame 700 are the same.

Referring to FIG. 7, the AP2 may receive both of the non-target RTS frame 700 and the non-target CTS frame 710. As described above, in such a case, the AP2 is unable to transmit a RTS frame and a data frame but may setup a NAV. At first, the AP may setup a first NAV 740 based on the non-target RTS frame 700, and then, the AP2 may setup a second NAV 750 by updating the first NAV 740 based on the non-target CTS frame 710.

Particularly, the AP2 that receives the non-target RTS frame 700 may receive the non-target CTS frame 710 in a predetermined time (e.g., SIFS). An AP may identify whether the RA field a receiver field included in the non-target CTS frame 710 is identical to the transmitter address (TA) field of the non-target RTS frame 700. The RA field of the non-target CTS frame 710 may include information on an identifier of the reception STA of the non-target CTS frame 710. The TA field of the non-target CTS frame 710 may include information on an identifier of the reception STA of the non-target CTS frame 710. The AP2 may determine whether an identifier of the reception STA of the non-target CTS frame 710 is identical to an identifier of the transmission STA of the non-target RTS frame 700 which is previously received.

If the identifier of the reception STA of the non-target CTS frame 710 is identical to the identifier of the transmission STA of the non-target RTS frame 700, it may be determined that the AP1 that transmits the non-target CTS frame 710 is also included in a coverage of the AP2. The AP2 may update the first NAV 740 which is setup based on the existing non-target RTS frame 700 to the second NAV 750 based on the non-target CTS frame 710 based on the duration field which is included in the non-target CTS frame 710.

Figure 8:
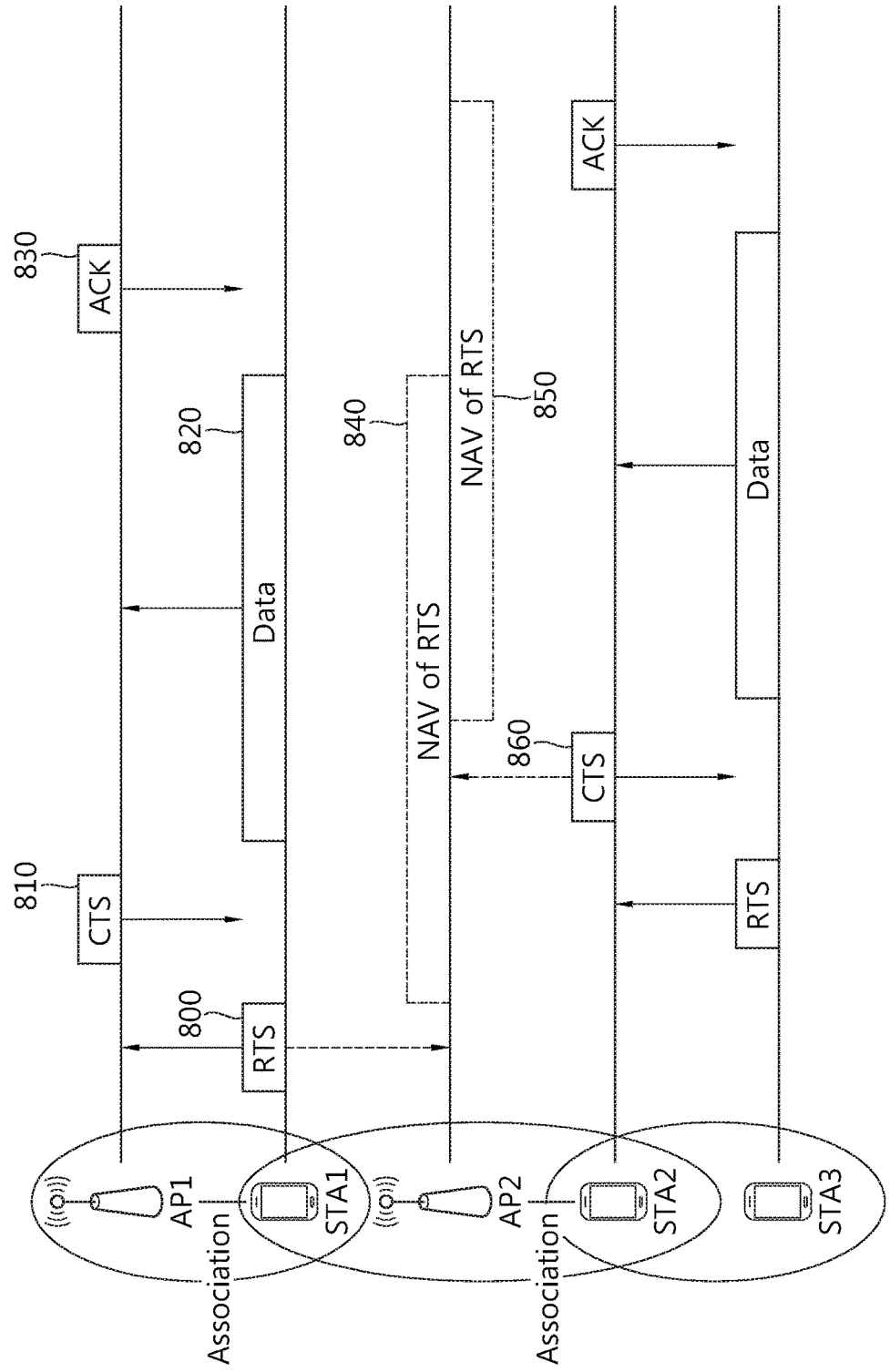
FIG. 8 is a conceptual diagram illustrating a method for setup a NAV according to an embodiment of the present invention.

FIG. 8 is a conceptual diagram illustrating a method for setup a NAV according to an embodiment of the present invention.

FIG. 8 shows a case that an AP2 receives a non-target CTS frame 860 in addition to a non-target RTS frame 800, but an identifier of a reception STA of the non-target CTS frame 860 and an identifier of a transmission STA of the non-target RTS frame 800 are not the same.

The identifier of a reception STA of the non-target CTS frame 860 may not the same as the identifier of a transmission STA of the non-target RTS frame 800. In such a case, an AP may compare a size of a NAV 840 which is setup based on a duration field of the non-target RTS frame 800 previously received with a size of a NAV 850 which is to be setup based on a duration field included in the non-target CTS frame 860, and setup a NAV based on a greater value between these.

For example, as shown in FIG. 8, in case that the NAV 850 which is to be setup based on the duration field included in the non-target CTS frame 860 is longer than the NAV 840 which is setup by the non-target RTS frame 800, a NAV may be setup based on the non-target CTS frame 860.

On the other hand, in case that the NAV which is to be setup based on the duration field included in the non-target RTS frame 800 is longer than the NAV which is setup by the non-target CTS frame 860, a NAV may be setup based on the non-target RTS frame 800.

In FIG. 6 to FIG. 8, the case is assumed that the AP2 receives the non-target RTS frame and transmits the RTS frame to the STA2. On the contrary, the STA2 may receive the non-target RTS frame and transmit the RTS frame to the AP2.

Figure 9:
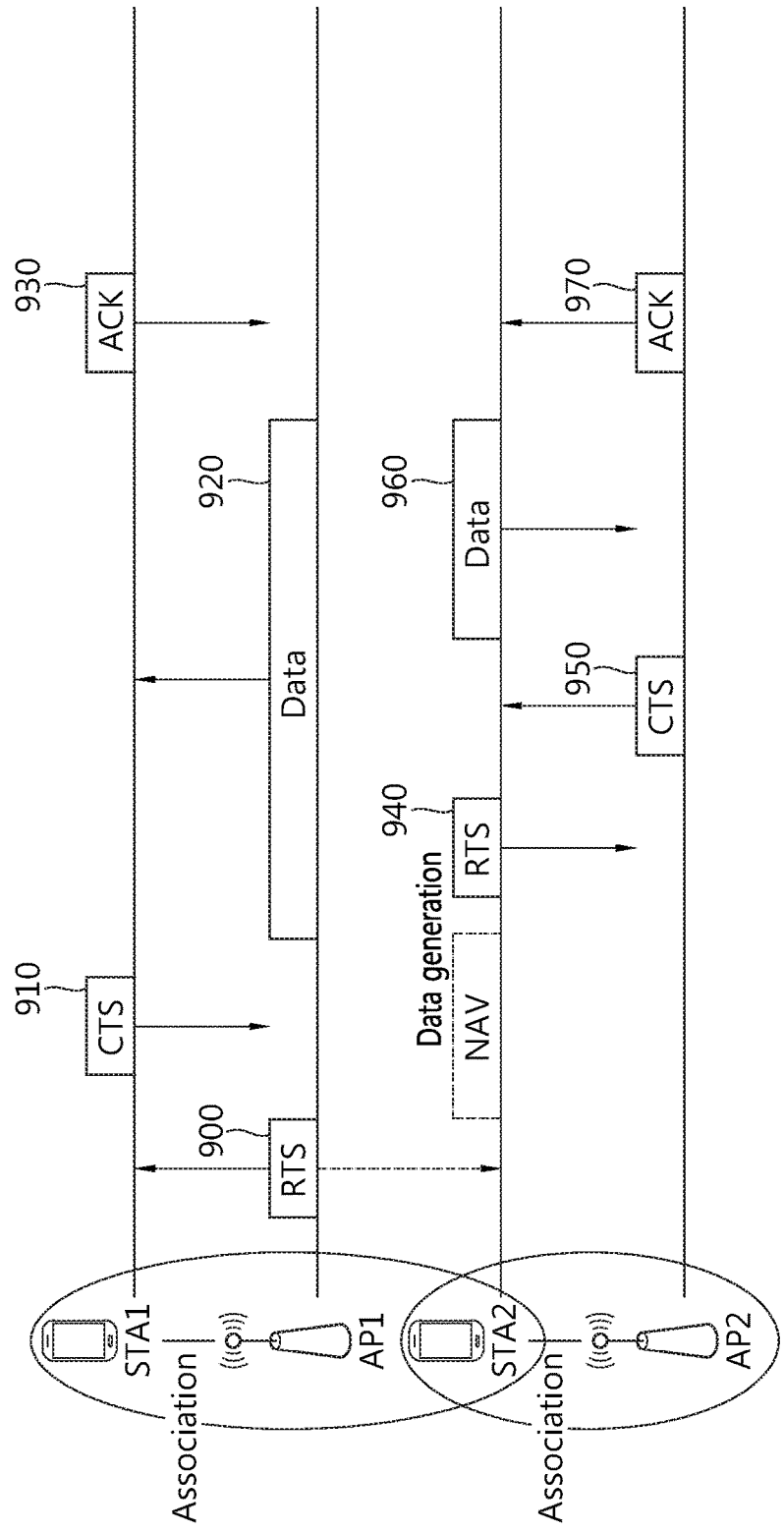
FIG. 9 is a conceptual diagram illustrating a transmission of data after a NAV configuration according to an embodiment of the present invention.

FIG. 9 is a conceptual diagram illustrating a transmission of data after a NAV configuration according to an embodiment of the present invention.

FIG. 9 shows a case that an STA2 receives a non-target RTS frame 900 and transmits a RTS frame 940 to an AP2. In FIG. 9, a case may be assumed that an STA1 is associated with an AP1, and the STA2 is associated with the AP2. In addition, a case is assumed that the STA1 and the STA2 are in a relation of hidden node, and the AP1 and the AP2 are in a relation of hidden node.

Referring to FIG. 9, the AP1 may transmit the RTS frame 900 and receive the non-target RTS frame 900. If the STA2 fails to receive the non-target CTS frame 910 in a predetermined time (e.g., SIFS) and has data to transmit to the AP2, the STA2 may transmit the RTS frame 940.

Similar to the operation of AP2 described above, the STA2 may transmit the RTS frame 940 and the data frame 960 by considering the TXOP of the AP1 and the AP2 which is determined based on the non-target RTS frame 900 and/or the non-target data frame 920.

The transmission completion time of the data frame 960 transmitted to the AP2 by the STA2 may be determined by considering the TXOP of the STA1 and/or the AP1 which is acquired based on the non-target RTS frame 900 and/or the non-target data frame 920. That is, a value of duration value of the RTS frame 940 transmitted to the AP2 by the STA2 may be determined by considering the TXOP which is acquired based on the non-target RTS frame 900 and/or the non-target data frame 920.

The STA2 may transmit the RTS frame 940 and, after SIFS, may receive the CTS frame 950 from the AP2. The STA2 that receives the CTS frame 950 from the AP2 may transmit the data frame 960 to the AP2. The transmission completion time of the data frame 960 transmitted by the STA2 may be setup as not longer (i.e., the same or shorter) than the transmission completion time of the data frame 920 of the AP1 based on the TXOP of the STA1 and the AP1. The STA2 may fragment or pad the data frame 960 which is to be transmitted by considering the TXOP of the STA1 and the AP1.

According to another embodiment of the present invention, without the transmission of the RTS frame/CTS frame between the AP2 and the STA2, a transmission of the data frame by the STA2 may be performed. For example, in case that a duration (or a length of data frame) of a data frame which is to be transmitted by the STA2 is longer than a predetermined duration, the STA2 may transmit the data frame to the AP2 without transmitting the RTS frame. In particular, the STA2 may transmit a data frame to the AP2 by considering only the TXOP of the AP1 and/or the STA1 without transmitting the RTS frame to the AP2. Even in this case, the data frame may be transmitted by occupying a medium before completing the transmission of the non-target data frame by the STA1.

Whether the duration of the data frame which is to be transmitted by the AP2 is longer than a predetermined duration may be determined by considering the TXOP of the STA1 and/or the AP1 which is acquired. Or, the STA2 may determine whether the data frame 960 is fragmented owing to the process of transmission of the RTS frame/reception of the CTS frame. If the data frame is fragmented owing to the process of transmission of the RTS frame/reception of the CTS frame, the STA2 may transmit the data frame to the AP2 without the process of transmission of the RTS frame/reception of the CTS frame so as to complete the transmission of the data frame before transmitting the non-target data frame of the AP1.

Figure 10:
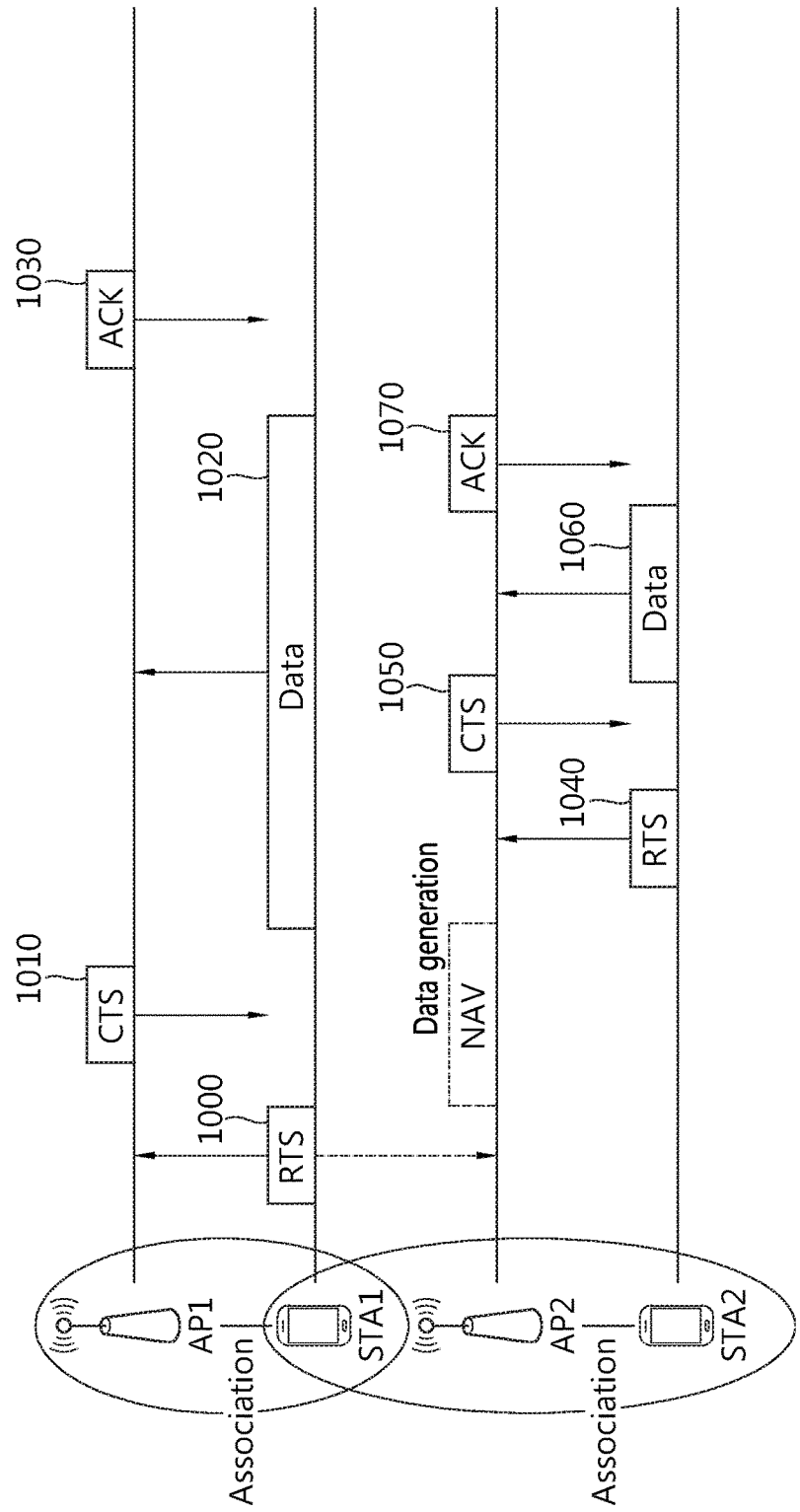
FIG. 10 is a conceptual diagram illustrating a reception process of data frame after a NAV configuration according to an embodiment of the present invention.

FIG. 10 is a conceptual diagram illustrating a reception process of data frame after a NAV configuration according to an embodiment of the present invention.

FIG. 10 shows an operation of an AP2 in case that the AP2 receives a RTS frame which is targeted by an STA2 which is associated with the AP2 after the AP2 setup a NAV based on a non-target RTS frame 1000. A case is assumed that the STA1 and the STA2 are in a relation of hidden node, and the AP1 and the AP2 are in a relation of hidden node.

Referring to FIG. 10, the AP2 receives the non-target RTS frame 1000 and the AP2 may not receive the non-target CTS frame 1010 after a predetermined time (e.g., SIFS). In this case, the AP2 may receive a data frame 1060 from the STA2 which is associated. For example, the AP2 may receive a RTS frame 1040 from the STA2 and transmit a CTS frame 1050 to the STA2 in response to the RTS frame 1040. The AP2 may receive the data frame 1060 from the STA2, and the AP2 may transmit an ACK frame 1070 to the STA2.

The CTS frame 1050 transmitted by the AP2 may be transmitted to the STA2 before completing transmission of the non-target data frame 1020 of the AP1. By using such a method, a collision may be prevented between the CTS frame 1050 and the frame (e.g., non-target ACK frame; 1030) transmitted from the AP1 to the STA1. The duration field included in the CTS frame 1050 may include information on a duration until the transmission of the ACK frame 1070 by the AP2 after the transmission of the CTS frame 1050. That is, the duration field included in the CTS frame 1050 may include information on the TXOP of the AP2.

The duration field included in the CTS frame 1050 may indicate a time before completing the transmission of the non-target data frame 1020 by the STA1. That is, the duration of the CTS frame 1050 may be determined such that the transmission of the ACK frame 1070 by the AP2 is completed before completing the transmission of the non-target data frame 1020 by the STA1. By using such a method, a collision may be prevented between the ACK frame 1070 transmitted by the AP2 and the non-target ACK frame 1030 transmitted by the AP1.

The duration field included in the CTS frame 1050 of the AP2 may indicate a time after completing the transmission of the non-target data frame 1020 by the STA1. That is, the duration may be setup such that the transmission of the ACK frame 1070 by the AP2 is performed at a time after the transmission of the non-target ACK frame 1030 by the AP1.

Figure 11:
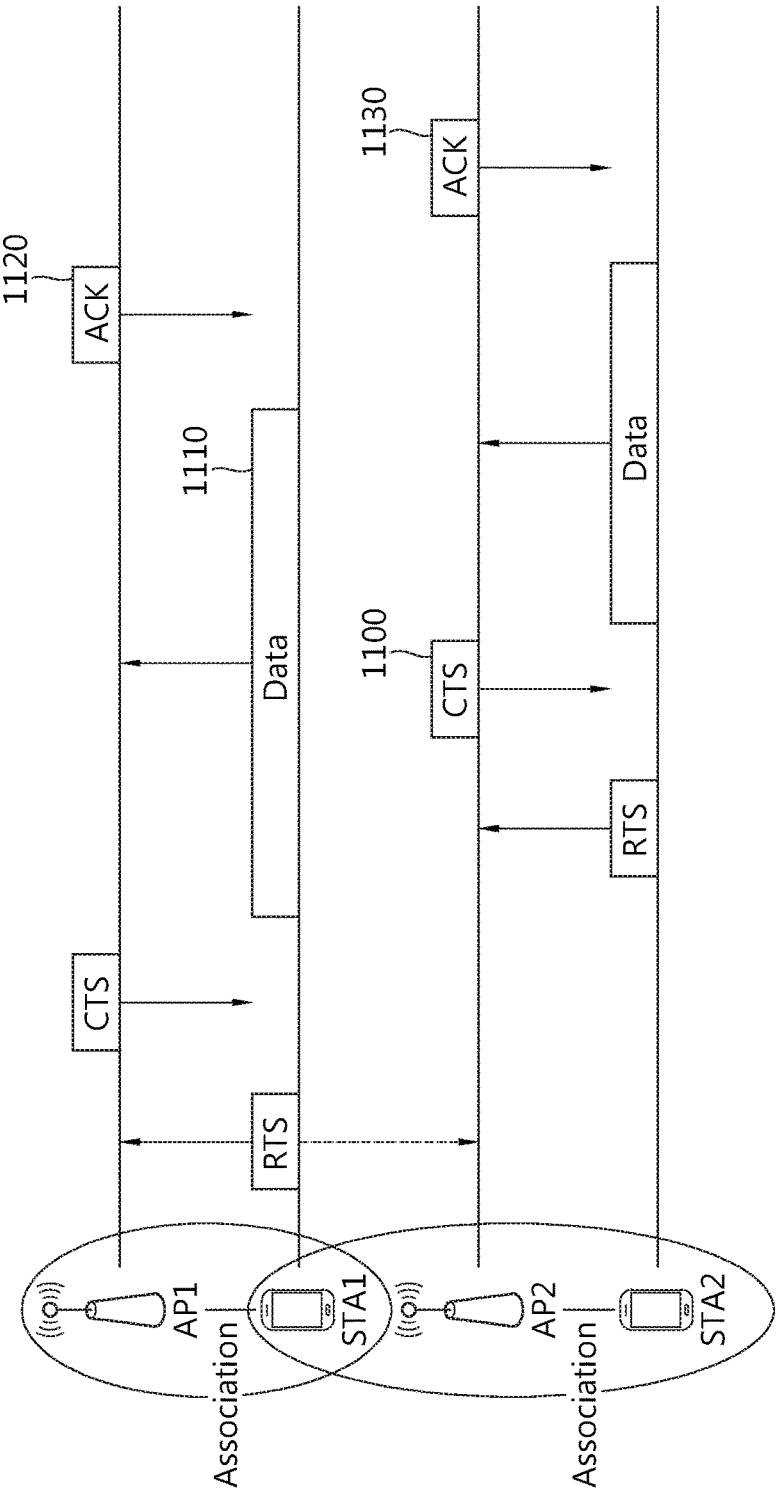
FIG. 11 is a conceptual diagram illustrating a reception process of data frame after a NAV configuration according to an embodiment of the present invention.

FIG. 11 is a conceptual diagram illustrating a reception process of data frame after a NAV configuration according to an embodiment of the present invention.

FIG. 11 shows a case that a TXOP of an AP2 is configured to indicate a later time than a TXOP of an STA1. A case is assumed that the STA1 and the STA2 are in a relation of hidden node, and the AP1 and the AP2 are in a relation of hidden node.

Referring to FIG. 11, an end point of a second TXOP indicated based on a duration field of a CTS frame 1100 of the AP2 is located ahead of an end point of a first TXOP indicated based on a duration field of a non-target data frame 1110 of the STA1.

In case that the end point of the second TXOP is located ahead of the end point of the first TXOP, a collision may not occur between an ACK frame 1130 transmitted by the AP2 and a non-target ACK frame 1120 transmitted by the AP1.

In FIG. 10 and FIG. 11, the case is assumed that the AP2 receives the non-target RTS frame and receives the RTS frame from the STA2. On the contrary, the STA2 may receive the non-target RTS frame and receive the RTS frame from the AP2.

Figure 12:
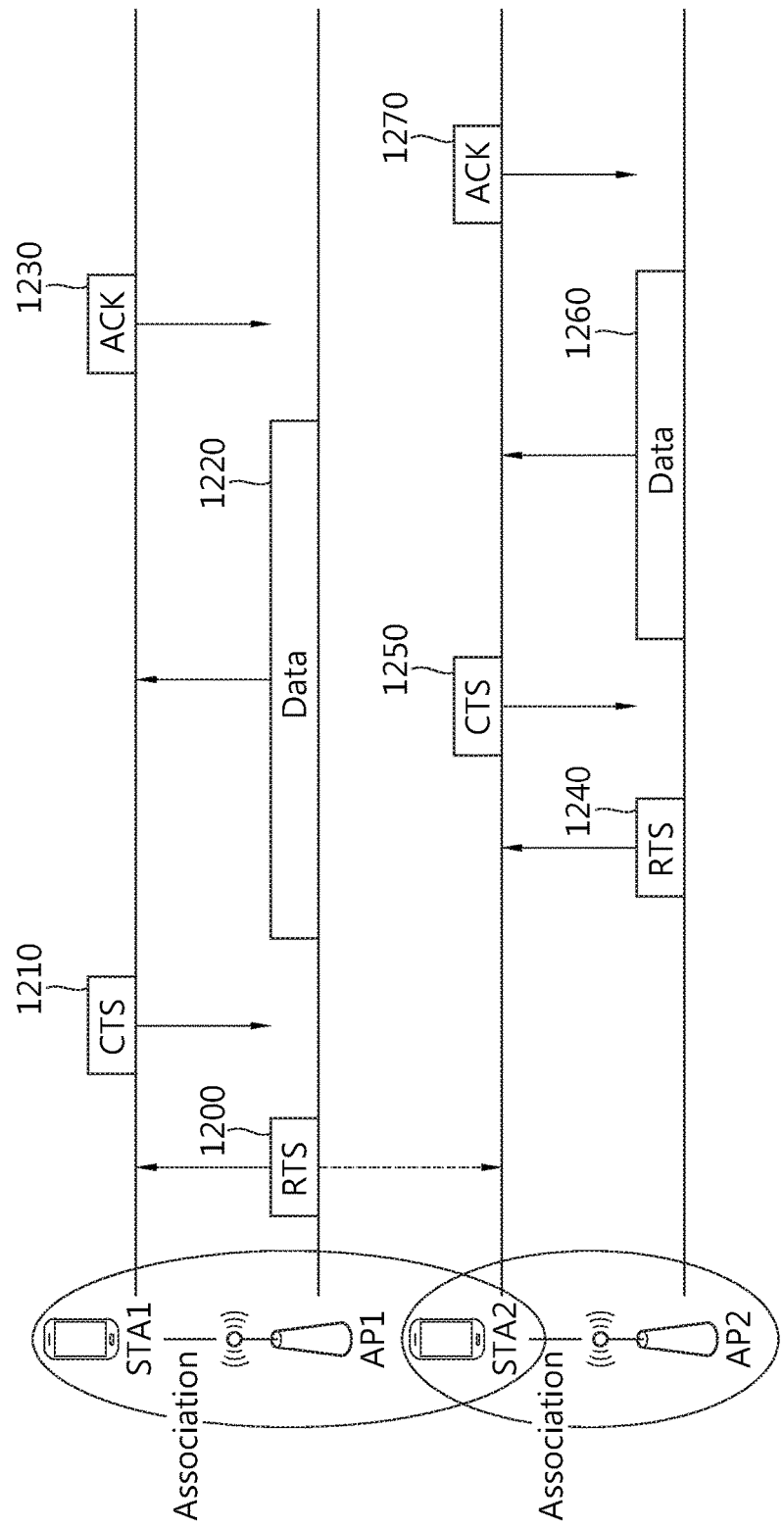
FIG. 12 is a conceptual diagram illustrating a reception process of data frame after a NAV configuration according to an embodiment of the present invention.

FIG. 12 is a conceptual diagram illustrating a reception process of data frame after a NAV configuration according to an embodiment of the present invention.

FIG. 12 shows an operation of an STA2 in case that the STA2 receives a RTS frame 1240 which is targeted by an AP2 which is associated with the STA2 after the STA2 setup a NAV based on a non-target RTS frame 1200. A case is assumed that the STA1 and the STA2 are in a relation of hidden node, and the AP1 and the AP2 are in a relation of hidden node.

Referring to FIG. 12, the STA2 receives the non-target RTS frame 1200 and the STA2 may not receive the non-target CTS frame 1210 after a predetermined time (e.g., SIFS). In this case, the STA2 may receive a data frame 1260 from the AP2 which is associated.

For example, the STA2 may receive a RTS frame 1240 from the AP2 and transmit a CTS frame 1250 to the AP2 in response to the RTS frame 1240. The STA2 may receive the data frame 1260 from the AP2, and the STA2 may transmit an ACK frame 1270 to the AP2.

The CTS frame 1250 transmitted by the STA2 may be transmitted to the AP2 before completing transmission of the non-target data frame 1220 of the AP1. By using such a method, a collision may be prevented between the CTS frame 1250 and the frame (e.g., non-target ACK frame; 1230) transmitted from the STA1 to the AP1. The duration field included in the CTS frame 1250 may include information on a duration (or TXOP of the STA2) until the transmission of the ACK frame 1270 by the STA2 after the transmission of the CTS frame 1250.

The duration information included in the CTS frame of the STA2 may be determined such that the transmission of the ACK frame 1270 by the STA2 is performed at a time after transmitting the non-target CTS frame 1230 by the STA1. Through such a method, a TXOP of the STA2 may be setup such that the ACK frame 1270 is transmitted by the STA2 after the transmission of the non-target ACK frame 1230 by the STA1. By using such a method, a collision may be prevented between the ACK frame 1270 transmitted by the STA2 and the non-target ACK frame 1230 transmitted by the STA1.

Figure 13:
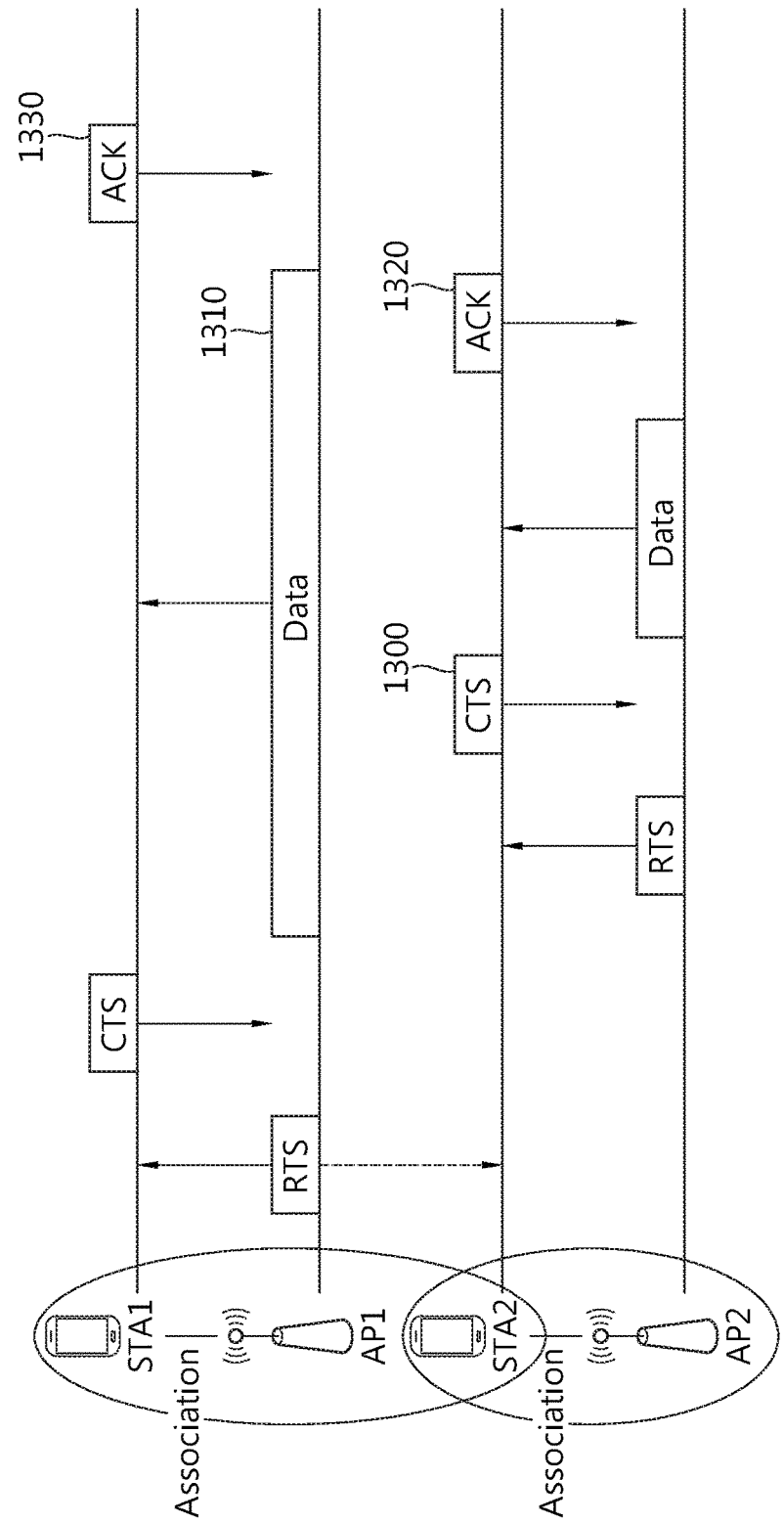
FIG. 13 is a conceptual diagram illustrating a reception process of data frame after a NAV configuration according to an embodiment of the present invention.

FIG. 13 is a conceptual diagram illustrating a reception process of data frame after a NAV configuration according to an embodiment of the present invention.

Referring to FIG. 13, according to the duration information included in a CTS frame 1300, a TXOP of an STA2 may be determined at a time before the transmission completion of a non-target data frame 1310 by an STA1.

That is, a duration field of the CTS frame 1300 is determined such that the transmission of an ACK frame 1320 by the STA2 is completed before the transmission completion of a non-target data frame 1310 by the AP1. By using such a method, a collision may be prevented between the ACK frame 1270 transmitted by the STA2 and the non-target ACK frame 1230 transmitted by the STA1.

Figure 14:
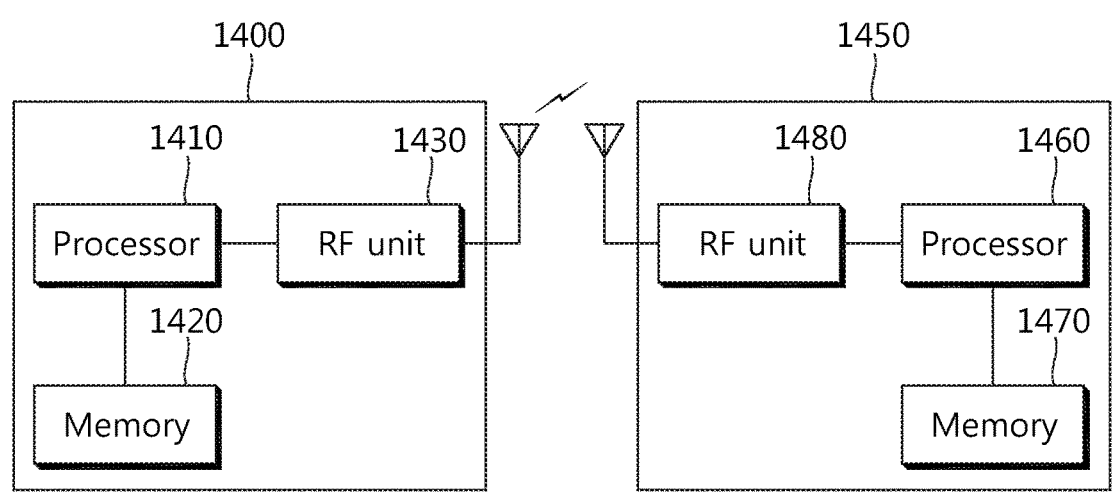
FIG. 14 is a block diagram illustrating the wireless apparatus in which an embodiment of the present invention can be implemented.

FIG. 14 is a block diagram illustrating the wireless apparatus in which an embodiment of the present invention can be implemented.

Referring to FIG. 14, the wireless apparatus 1400 is an STA that may implement the embodiments described above, and may also be an AP 1400 or non-AP station (or STA; 1450).

The AP 1400 includes a processor 1410, a memory 1420 and a radio frequency (RF) unit 1430.

The RF unit 1430 may be connected to the processor 1410 and transmits/receives the radio signal.

The processor 1410 implements the proposed functions, processes and/or methods. For example, the processor 1410 may be configured to perform the operation of the wireless apparatus according to the embodiments of the present invention described above. The processor may perform the operation of the wireless apparatus described in the embodiments of FIG. 6 to FIG. 13.

For example, the processor 1410 may be implemented to transmit the RTS frame to the STA in case of receiving the non-target RTS frame from another STA but failing to receive the non-target CTS frame in a predetermined time, and trying to transmit the data frame to the STA. In addition, the processor 1410 may be implemented to transmit the data frame to the STA in case of receiving the CTS frame in response to the RTS frame from the STA.

At the moment, the non-target RTS frame may include the RA field that indicates another STA, and the non-target CTS frame may be a response frame to the non-target RTS frame. The first duration value included in the RTS frame for determining a transmission duration of the data frame is determined based on the second duration value included in the non-target RTS frame.

Or, the processor 1410 may be implemented to transmit the CTS frame in response to the RTS frame and receive the data frame from the STA in case of receiving the non-target RTS frame from another STA and failing to receive the non-target CTS frame in a predetermined time, and receiving the RTS frame from the STA.

The STA 1450 includes a processor 1460, a memory 1470 and a radio frequency (RF) unit 1480.

The RF unit 1480 may be connected to the processor 1460 and transmits/receives the radio signal.

The processor 1460 implements the proposed functions, processes and/or methods. For example, the processor may be configured to perform the operation of the wireless apparatus according to the embodiments of the present invention described above. The processor may perform the operation of the wireless apparatus described in the embodiments of FIG. 6 to FIG. 13.

For example, the processor 1460 may be implemented to transmit the request to send (RTS) frame to the access point (AP) in case of receiving the non-target RTS frame from another STA but failing to receive the non-target clear to send (CTS) frame in a predetermined time, and trying to transmit the data frame to the AP. In addition, the processor 1460 may be implemented to transmit the data frame to the AP in case of receiving the CTS frame in response to the RTS frame from the AP.

At the moment, the non-target RTS frame may include the receiving address (RA) field that indicates another STA, and the non-target CTS frame may be a response frame to the non-target RTS frame. The first duration value included in the RTS frame for determining a transmission duration of the data frame is determined based on the second duration value included in the non-target RTS frame.

The processor 1410 and 1460 may include Application-Specific Integrated Circuits (ASICs), other chipsets, logic circuits, data processors and/or convertors that reciprocally convert baseband signals and radio signals. The memory 1420 and 1470 may include Read-Only Memory (ROM), Random Access Memory (RAM), flash memory, memory cards, storage media and/or other storage devices. The RF unit 1430 and 1480 may include one or more antennas to transmit and/or receive the radio signal.

When the embodiment is implemented in software, the aforementioned scheme may be implemented as a module (process or function) that performs the aforementioned function. The module may be stored in the memory 1420 and 1470, and may be executed by the processor 1410 and 1460. The memory 1420 and 1470 may be placed inside or outside the processor 1410 and 1460 and may be connected to the processor 1410 and 1460 using a variety of well-known means.

What is claimed is:

1. A method for transmitting data in wireless local network (WLAN), the method performed by a first station (STA) and comprising:

receiving a non-target request to send (RTS) frame from a second STA, wherein the non-target RTS frame includes a first receiving address (RA) field indicating a third STA and a first duration field indicating a first transmission duration for a non-target data frame to be transmitted by the second STA after the non-target RTS frame;

transmitting a target RTS frame to transmit a target data frame to a fourth STA if a non-target clear to send (CTS) frame is not received within a predetermined time in response to the non-target RTS frame; and transmitting the target data frame to the fourth STA if a CTS frame is received in response to the RTS frame from the fourth STA, wherein the target RTS frame includes a second RA field indicating the fourth STA and a second duration field indicating a second transmission duration for the target data frame, wherein a second duration value of the second duration field is determined based on a first duration value of the first duration field, and wherein the second duration value is set such that an end of the second transmission duration does not exceed an end of the first transmission duration.

2. The method of claim 1, wherein:

the target data frame includes a padding bit determined based on a transmission completion time of the non-target data frame if an anticipated transmission completion time of the target data frame is earlier than the transmission completion time; and the target data frame includes a padding bit determined based on a transmission completion time of the non-target data frame if an anticipated transmission completion time of the target data frame is later than the transmission completion time.

3. The method of claim 1, wherein:

the predetermined time is a short inter frame symbol (SIFS); and a basic service set (BSS) of the second STA is different from a BSS of the first STA.

4. The method of claim 1, wherein:

the first STA is associated with the fourth STA; and
the second STA is associated with the third STA.

5. A method for transmitting data in wireless local network (WLAN), the method performed by a first station (STA) and comprising:

receiving a non-target request to send (RTS) frame from a second STA, wherein the non-target RTS frame includes a first receiving address (RA) field indicating a third STA and a first duration field indicating a first transmission duration for a non-target data frame to be transmitted by the second STA after the non-target RTS frame;

transmitting a target RTS frame to transmit a target data frame to a fourth STA if a non-target clear to send (CTS) frame is not received within a predetermined time in response to the non-target RTS frame; and transmitting the target data frame to the fourth STA if a CTS frame is received in response to the RTS frame from the fourth STA, wherein the target RTS frame includes a second RA field indicating the fourth STA and a second duration field indicating a second transmission duration for the target data frame, wherein a second duration value of the second duration field is determined based on a first duration value of the first duration field, and wherein the second duration value is set such that an end of a reception of an acknowledgement frame corresponding to the target data frame does not exceed an end of the first transmission duration.

6. The method of claim 5, wherein:

the target data frame includes a padding bit determined based on a transmission completion time of the non-target data frame if an anticipated transmission completion time of the target data frame is earlier than the transmission completion time; and the target data frame includes a padding bit determined based on a transmission completion time of the non-target data frame if an anticipated transmission completion time of the target data frame is later than the transmission completion time.

7. The method of claim 5, wherein:

the predetermined time is a short inter frame symbol (SIFS); and a basic service set (BSS) of the second STA is different from a BSS of the first STA.

8. The method of claim 5, wherein:

the first STA is associated with the fourth STA; and
the second STA is associated with the third STA.

9. A first station (STA) transmitting data in wireless local network (WLAN), the first STA comprising:

a radio frequency (RF) unit configured to transmit and receive radio signals;

a processor operatively connected to the RF unit and configured to:

receive a non-target request to send (RTS) frame from a second STA, wherein the non-target RTS frame includes a first receiving address (RA) field indicating a third STA and a first duration field indicating a first transmission duration for a non-target data frame to be transmitted by the second STA after the non-target RTS frame;

transmit a target RTS frame to transmit a target data frame to a fourth STA if a non-target clear to send (CTS) frame is not received within a predetermined time in response to the non-target RTS frame, wherein the target RTS frame includes a second RA field indicating the fourth STA and a second duration field indicating a second transmission duration for the tartlet data frame, wherein a second duration value of the second duration field is determined based on a first duration value of the first duration field, and wherein the second duration value is set such that an end of the second transmission duration does not exceed an end of the first transmission duration.

10. The first STA of claim 9, wherein:

the target data frame includes a padding bit determined based on a transmission completion time of the non-target data frame if an anticipated transmission completion time of the target data frame is earlier than the transmission completion time; and the target data frame includes a padding bit determined based on a transmission completion time of the non-target data frame if an anticipated transmission completion time of the target data frame is later than the transmission completion time.

11. The first STA of claim 9, wherein:
the predetermined time is a short inter frame symbol (SIFS); and
a basic service set (BSS) of the second STA is different from a BSS of the first STA.

12. The method of claim 9, wherein:
the first STA is associated with the fourth STA; and
the second STA is associated with the third STA.

* * * * *